United States Patent
Lin et al.

(10) Patent No.: US 11,246,450 B2
(45) Date of Patent: Feb. 15, 2022

(54) STIRRING RIB, STIRRING MECHANISM AND COOKING ROBOT

(71) Applicant: SHENZHEN FANLAI TECHNOLOGY CO., LTD., Guangdong (CN)

(72) Inventors: Ze Lin, Guangdong (CN); Long Ma, Guangdong (CN)

(73) Assignee: SHENZHEN FANLAI TECHNOLOGY CO., LTD., Shenzhen (CN)

( * ) Notice: Subject to any disclaimer, the term of this patent is extended or adjusted under 35 U.S.C. 154(b) by 555 days.

(21) Appl. No.: 16/317,545

(22) PCT Filed: Aug. 14, 2017

(86) PCT No.: PCT/CN2017/097341
§ 371 (c)(1),
(2) Date: Jan. 13, 2019

(87) PCT Pub. No.: WO2018/157561
PCT Pub. Date: Sep. 7, 2018

(65) Prior Publication Data
US 2019/0290060 A1     Sep. 26, 2019

(30) Foreign Application Priority Data

Feb. 28, 2017   (CN) .......................... 201710113591.7

(51) Int. Cl.
| A47J 36/16 | (2006.01) |
| A47J 36/02 | (2006.01) |
| B01F 7/04 | (2006.01) |
| B01F 7/00 | (2006.01) |

(52) U.S. Cl.
CPC ............. A47J 36/165 (2013.01); A47J 36/02 (2013.01); B01F 7/00133 (2013.01); B01F 7/00316 (2013.01); B01F 7/043 (2013.01)

(58) Field of Classification Search
CPC ..... A47J 36/165; A47J 36/02; B01F 7/00133; B01F 7/00316; B01F 7/043
(Continued)

(56) References Cited

U.S. PATENT DOCUMENTS 3,132,849 A * 5/1964 Kritikson .............. A47J 36/165
                                                366/282
3,169,753 A * 2/1965 Wegh ...................... A01J 15/14
                                                366/279
(Continued)

FOREIGN PATENT DOCUMENTS

| CN | 204445492 U | 7/2015 |
| CN | 105942836 A | 9/2016 |

(Continued)

OTHER PUBLICATIONS

International Search Report of PCT Patent Application No. PCT/CN2017/097341 dated Dec. 1, 2017.
(Continued)

*Primary Examiner* — Charles Cooley

(57) ABSTRACT

A stirring rib (100), a stirring mechanism and a cooking robot are provided. The stirring rib includes a first rotating shaft (110), a second rotating shaft (120), a first connecting rod (130), a second connecting rod (140), a first extending rod (150), a second extending rod (160), and a stirring blade (170). The first connecting rod is connected to one shaft end of the first rotating shaft and is arranged in a downward extending manner. The second connecting rod is connected to one shaft end of the second rotating shaft and is arranged in a downward extending manner. The first extending rod is connected to a bottom of the first connecting rod. The second extending rod is connected to a bottom of the second connecting rod.

9 Claims, 3 Drawing Sheets

(58) Field of Classification Search
USPC .......................................................... 99/348
See application file for complete search history.

(56) References Cited

U.S. PATENT DOCUMENTS

| | | | | |
|---|---|---|---|---|
| 3,722,834 A | * | 3/1973 | Bakewell | A21C 1/06 366/99 |
| 4,878,627 A | | 11/1989 | Otto | |
| 5,163,357 A | * | 11/1992 | Felknor | A23L 7/187 366/252 |
| 6,286,990 B1 | * | 9/2001 | De Zuazo Torres | A47J 36/165 366/282 |
| 8,066,427 B2 | * | 11/2011 | Wong | B01F 7/04 366/276 |
| 2019/0290060 A1 | * | 9/2019 | Lin | B01F 7/00316 |

FOREIGN PATENT DOCUMENTS

| | | |
|---|---|---|
| CN | 205568639 U | 9/2016 |
| CN | 205649382 U | 10/2016 |
| CN | 106724870 A | 5/2017 |
| EP | 2147601 A1 | 1/2010 |
| EP | 2347656 A2 | 7/2011 |
| KR | 101167275 B1 | 7/2012 |

OTHER PUBLICATIONS

Extended European Search Report of counterpart European Patent Application No. 17898417.5 dated Dec. 2, 2019.

* cited by examiner

STIRRING RIB, STIRRING MECHANISM AND COOKING ROBOT

TECHNICAL FIELD

The present invention belongs to the field of food processing, and in particular to a stirring rib, a stirring mechanism and a cooking robot.

BACKGROUND

A stirring structural part in an existing stirring mechanism can only push a food material to move in one direction, the food material is not easily turned over, and thus the stirring effect is poor.

SUMMARY

An objective of the present invention is to overcome the above-mentioned defects of the prior art and provide a stirring rib to solve the problem of poor stirring effect.

The present invention is implemented as follows.

A stirring rib includes a first rotating shaft, a second rotating shaft, a first connecting rod, a second connecting rod, a first extending rod, a second extending rod, and a stirring blade, where the first rotating shaft and the second rotating shaft are disposed oppositely, coaxially and horizontally; the first connecting rod is connected to one shaft end of the first rotating shaft and is arranged in a downward extending manner; the second connecting rod is connected to one shaft end of the second rotating shaft and is arranged in a downward extending manner; the first extending rod is connected to a bottom of the first connecting rod, is arranged in a forward extending manner, and is perpendicular to the first rotating shaft and the first connecting rod; the second extending rod is connected to a bottom of the second connecting rod, is arranged in a backward extending manner, and is perpendicular to the second rotating shaft and the second connecting rod; one end of the stirring blade is connected to a free end of the first extending rod, and the other end of the stirring blade is connected to a free end of the second extending rod; and a blade surface of the stirring blade is perpendicular to a horizontal plane.

Optionally, the first extending rod is disposed in a platy manner and is perpendicular to the horizontal plane; the first extending rod is connected with the stirring blade through a first connecting blade; the first connecting blade is disposed in an arc-shaped manner, and a blade surface of the first connecting blade is perpendicular to the horizontal plane; and the first connecting blade is fitted to a curved surface of the stirring blade, and is further fitted to a curved surface of the first extending rod.

Optionally, the second extending rod is disposed in a platy manner and is perpendicular to the horizontal plane; the second extending rod is connected with the stirring blade through a second connecting blade; the second connecting blade is disposed in an arc-shaped manner, and a blade surface of the second connecting blade is perpendicular to the horizontal plane; and the second connecting blade is fitted to a curved surface of the stirring blade, and is further fitted to a curved surface of the second extending rod.

Optionally, the blade surface of the stirring blade is disposed at an included angle of 5-35° with an axial line of the first rotating shaft or the second rotating shaft.

Optionally, the first connecting rod and the second connecting rod are equal in length.

Optionally, the first connecting rod is connected to a shaft end, close to the second rotating shaft, of the first rotating shaft, and/or the second connecting rod is connected to a shaft end, close to the first rotating shaft, of the second rotating shaft.

The present invention further provides a stirring mechanism, which includes the above-mentioned stirring rib, and a pot; an open chamber is formed on the pot; the first extending rod, the second extending rod and the stirring blade are placed in the open chamber; and both the first connecting rod and the second connecting rod extend from an inside of the open chamber to an outside of the open chamber.

Preferably, a mating surface is formed when the first connecting rod, the second connecting rod, the first extending rod, the second extending rod and an outer edge of the stirring blade swing back and forth with the first rotating shaft or the second rotating shaft; and a chamber surface of the open chamber is matched with the mating surface.

Preferably, a gap between a chamber surface of the open chamber and the mating surface is 0.5-3 mm.

The present invention further provides a cooking robot, which includes the above-mentioned stirring mechanism.

Based on the structure of the present invention, through the first rotating shaft, the second rotating shaft, the first connecting rod, the second connecting rod, the first extending rod, the second extending rod and the stirring blade, since a motion direction of the stirring blade is not perpendicular to the blade surface of the stirring blade and a motion path of the stirring blade is in an arc shape, the food material can be stirred effectively, thereby ensuring the good stirring effect. Moreover, the stirring rib has a simple structure and is convenient to manufacture.

BRIEF DESCRIPTION OF DRAWINGS

In order to explain technical solutions of the present invention more clearly, the accompanying drawings used in the embodiments will be briefly introduced below. Apparently, the accompanying drawings in the following description are only some embodiments of the present invention, and a person of ordinary skill in the art can derive other drawings from these accompanying drawings without any creative effort.

Figure 1:
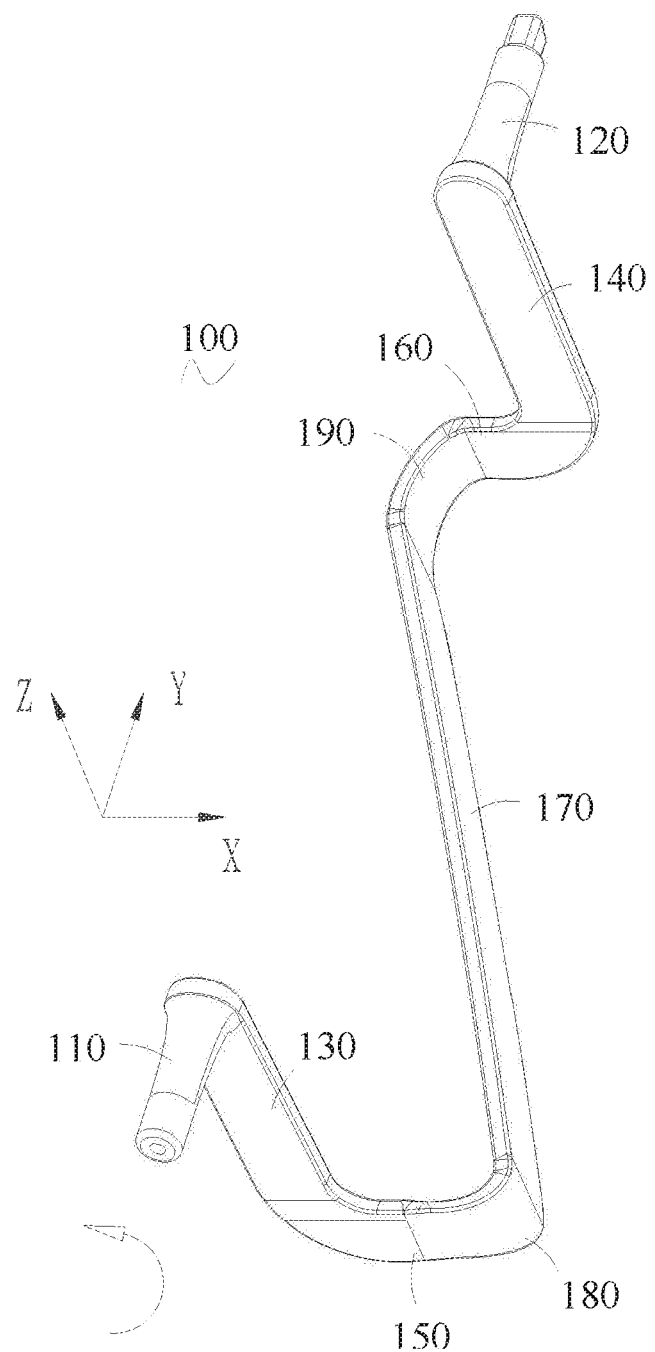
FIG. 1 is a stereoscopic view of a stirring rib according to a first embodiment of the present invention.

Description of reference numerals in accompanying drawings:

TABLE 1

| Numerals | Name | Numerals | Name |
|---|---|---|---|
| 100 | Stirring rib | | |
| 110 | First rotating shaft | 120 | Second rotating shaft |
| 130 | First connecting rod | 140 | Second connecting rod |
| 150 | First extending rod | 160 | Second extending rod |
| 170 | Stirring blade | | |
| 180 | First connecting blade | 190 | Second connecting blade |
| 200 | Pot | 201 | Open chamber |

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention and are not intended to limit the present invention.

It should be noted that, in the embodiment of the present invention, an XYZ rectangular coordinate system established according to FIG. 1 is defined as follows: one side located in a positive direction of an X axis is defined as a front side, and one side located in a negative direction of the X axis is defined as a rear side; one side located in a positive direction of a Y axis is defined as a left side, and one side located in a negative direction of the Y axis is defined as a right side; one side located in a positive direction of a Z axis is defined as an upper side, and one side located in a negative direction of the Z axis is defined as a lower side.

In addition, the terms such as "first" and "second" are merely for a descriptive purpose, and cannot be understood as indicating or implying relative importance, or implicitly indicating the number of the indicated technical features. Hence, the features defined by "first" and "second" can explicitly or implicitly include one or more features. In the description of the present invention, "a plurality of" means two or more, unless other specific definition.

Embodiment 1

An embodiment of the present invention provides a stirring rib 100.

Figure 2:
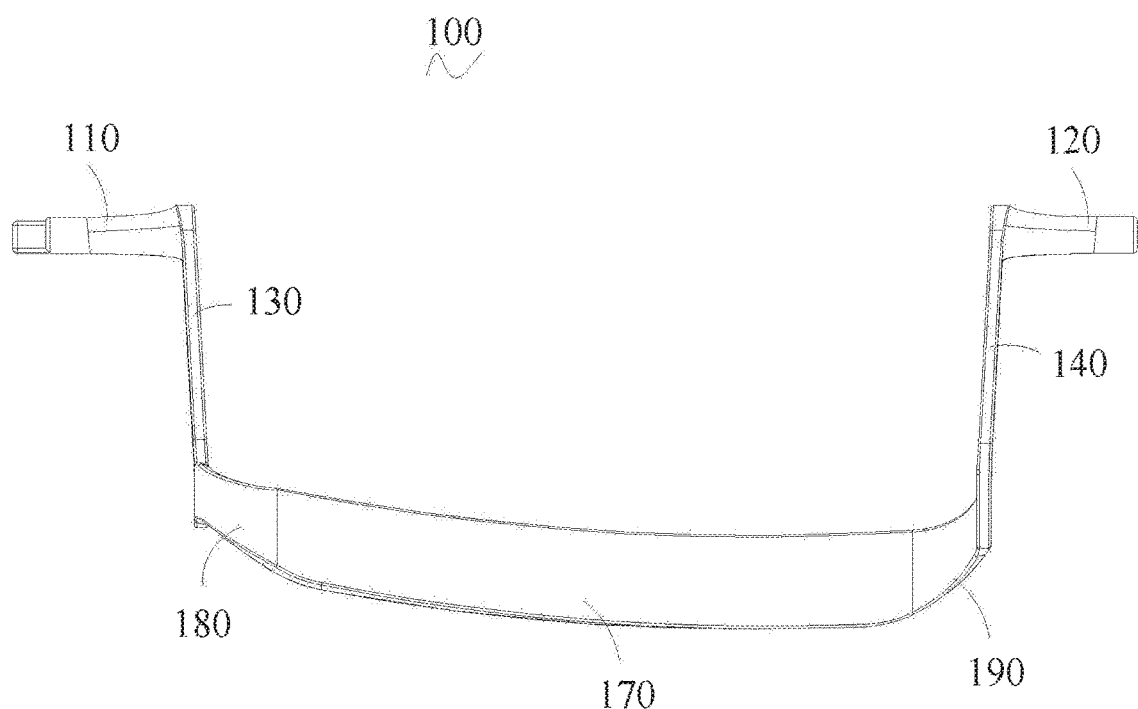
FIG. 2 is a front view of the stirring rib according to a first embodiment of the present invention.
Figure 3:
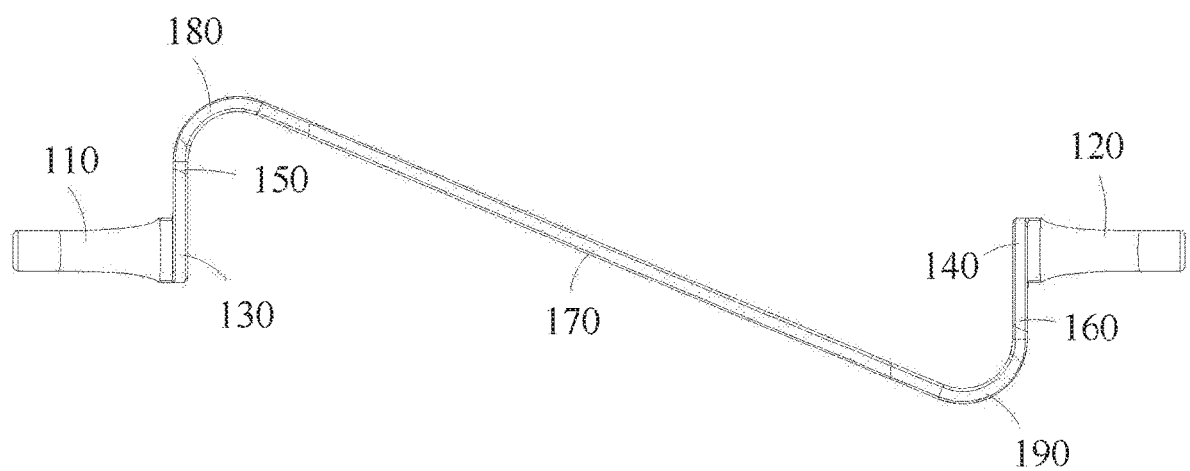
FIG. 3 is a vertical view of the stirring rib according to a first embodiment of the present invention.

Referring to FIG. 1 to FIG. 3, the stirring rib 100 includes a first rotating shaft 110, a second rotating shaft 120, a first connecting rod 130, a second connecting rod 140, a first extending rod 150, a second extending rod 160, and a stirring blade 170. In this embodiment, the stirring rib 100 may be made of a stainless steel, and may also be made of other materials having good hardness and conforming to the processing in the food field; the first rotating shaft 110, the second rotating shaft 120, the first connecting rod 130, and the second connecting rod 140, the first extending rod 150, the second extending rod 160 and the stirring blade 170 are of an integrated structure, which is beneficial to improving the mechanical strength of the stirring rib 100.

The first rotating shaft 110 and the second rotating shaft 120 are disposed oppositely, coaxially and horizontally. The first rotating shaft 110 or the second rotating shaft 120 may be directly connected with a motor, and may also be connected with the motor via a transmission mechanism such as a star wheel.

The first connecting rod 130 is connected to one shaft end of the first rotating shaft 110 and is arranged in a downward extending manner, and the second connecting rod 140 is connected to one shaft end of the second rotating shaft 120 and is arranged in a downward extending manner. The first extending rod 150 is connected to a bottom of the first connecting rod 130, is arranged in a forward extending manner, and is perpendicular to the first rotating shaft 110 and the first connecting rod 130; and the second extending rod 160 is connected to a bottom of the second connecting rod 140, is arranged in a backward extending manner, and is perpendicular to the second rotating shaft 120 and the second connecting rod 140. One end of the stirring blade 170 is connected to a free end of the first extending rod 150, and the other end of the stirring blade 170 is connected to a free end of the second extending rod 160; and a blade surface of the stirring blade 170 is perpendicular to a horizontal plane.

In specific use, as a forward mode, the stirring blade 170 may be driven to move along an axial line of the first rotating shaft 110 or the second rotating shaft 120 via the first rotating shaft 110, the second rotating shaft 120, the first connecting rod 130, the second connecting rod 140, the first extending rod 150 and the second extending rod 160, and the stirring blade is driven to move forward. A direction of a hollow arrow in FIG. 1 is a rotating direction of the stirring blade 170, and a food material (not shown in the figure) is placed at a front side of the stirring blade 170. Since a motion direction of the stirring blade 170 is not perpendicular to the blade surface of the stirring blade 170, while the stirring blade 170 drives the food material to move forward, the material slides along the blade surface of the stirring blade 170 and slides leftward; since a motion path of the stirring blade 170 is in an arc shape, the food material moves forward, leftward and upward simultaneously under the action of the stirring blade 170, and the food material is quickly gathered at the left side; when the food material reaches a certain height, the food material drops; and at this time, the food material is turned over and stirred for a first time and then the above operation is circulated.

In other use processes, as a directional mode, the stirring blade 170 may be driven to move along the axial line of the first rotating shaft 110 or the second rotating shaft 120 via the first rotating shaft 110, the second rotating shaft 120, the first connecting rod 130, the second connecting rod 140, the first extending rod 150 and the second extending rod 160, and the stirring blade is driven to move backward. The food material is placed at a rear side of the stirring blade 170. Since the motion direction of the stirring blade 170 is not perpendicular to the blade surface of the stirring blade 170, while the stirring blade 170 drives the food material to move forward, the material slides along the blade surface of the stirring blade 170 and slides leftward; since the motion path of the stirring blade 170 is in the arc shape, the food material moves backward, rightward and upward simultaneously under the action of the stirring blade 170, and the food material is quickly gathered at the right side; when the food material reaches a certain height, the food material drops; and at this time, the food material is turned over and stirred for the first time and then the above operation is circulated.

In other use processes, as a positive and negative mode, after the food material is turned over and stirred for the first time, the stirring blade 170 moves reversely. With the adoption of this mode, the food material can be scattered more uniformly.

Based on the above, it may be seen that through the first rotating shaft 110, the second rotating shaft 120, the first connecting rod 130, the second connecting rod 140, the first extending rod 150, the second extending rod 160 and the stirring blade 170, the food material can be effectively turned over and stirred because the motion direction of the stirring blade 170 is not perpendicular to the blade surface of the stirring blade 170 and the motion path of the stirring blade 170 is in the arc shape, thereby ensuring the good stirring effect. Moreover, the stirring rib 100 has a simple structure and is convenient to manufacture.

Referring to FIG. 1 to FIG. 3 continuously. The first extending rod 150 is disposed in a platy manner and is perpendicular to the horizontal plane; the first extending rod 150 is connected with the stirring blade 170 through a first connecting blade 180; the first connecting blade 180 is disposed in an arc-shape manner, and a blade surface of the first connecting blade is perpendicular to the horizontal plane; and the first connecting blade 180 is fitted to a curved surface of the stirring blade 170, and is further fitted to a curved surface of the first extending rod 150. Based on this structural design, the stress concentration at the junction of the first extending rod 150 and the stirring blade 170 may be reduced, for the fear of breakage at the junction of the first extending rod 150 and the stirring blade 170 during operation.

The second extending rod 160 is disposed in a platy manner and is perpendicular to the horizontal plane; the second extending rod 160 is connected with the stirring blade 170 through a second connecting blade 190; the second connecting blade 190 is disposed in an arc-shape manner, and a blade surface of the second connecting blade is perpendicular to the horizontal plane; and the second connecting blade 190 is fitted to a curved surface of the stirring blade 170, and is further fitted to a curved surface of the second extending rod 160. Based on this structural design, the stress concentration at the junction of the second extending rod 160 and the stirring blade 170 may be reduced, for the fear of breakage at the junction of the second extending rod 160 and the stirring blade 170 during operation.

Referring to FIG. 3, the blade surface of the stirring blade 170 is disposed at an included angle of 5-35° with an axial line of the first rotating shaft 110 or the second rotating shaft 120. Specifically, in this embodiment, the blade surface of the stirring blade 170 is disposed at an included angle of 23° with the axial line of the first rotating shaft 110 or the second rotating shaft 120.

Referring to FIG. 1 to FIG. 3, the first connecting rod 130 and the second connecting rod 140 are equal in length. Based on the structural design, a regular mating surface is formed when the first connecting rod 130, the second connecting rod 140, the first extending rod 150, the second extending rod 160, and an outer edge of the stirring blade 170 swing back and forth with the first rotating shaft 110 or the second rotating shaft 120, so that a pot 200 subsequently used in conjunction with the stirring rib 100 also has a regular structure, thereby facilitating the production and manufacture.

Referring to FIG. 1 to FIG. 3 continuously, the first connecting rod 130 is connected to a shaft end, close to the second rotating shaft 120, of the first rotating shaft 110, and the second connecting rod 140 is connected to a shaft end, close to the first rotating shaft 110, of the second rotating shaft 120. Based on this structural design, a driving mechanism that cooperates with the first connecting rod 130 and the second connecting rod 140 is simplified.

Embodiment 2

The present invention provides a stirring mechanism.

Figure 4:
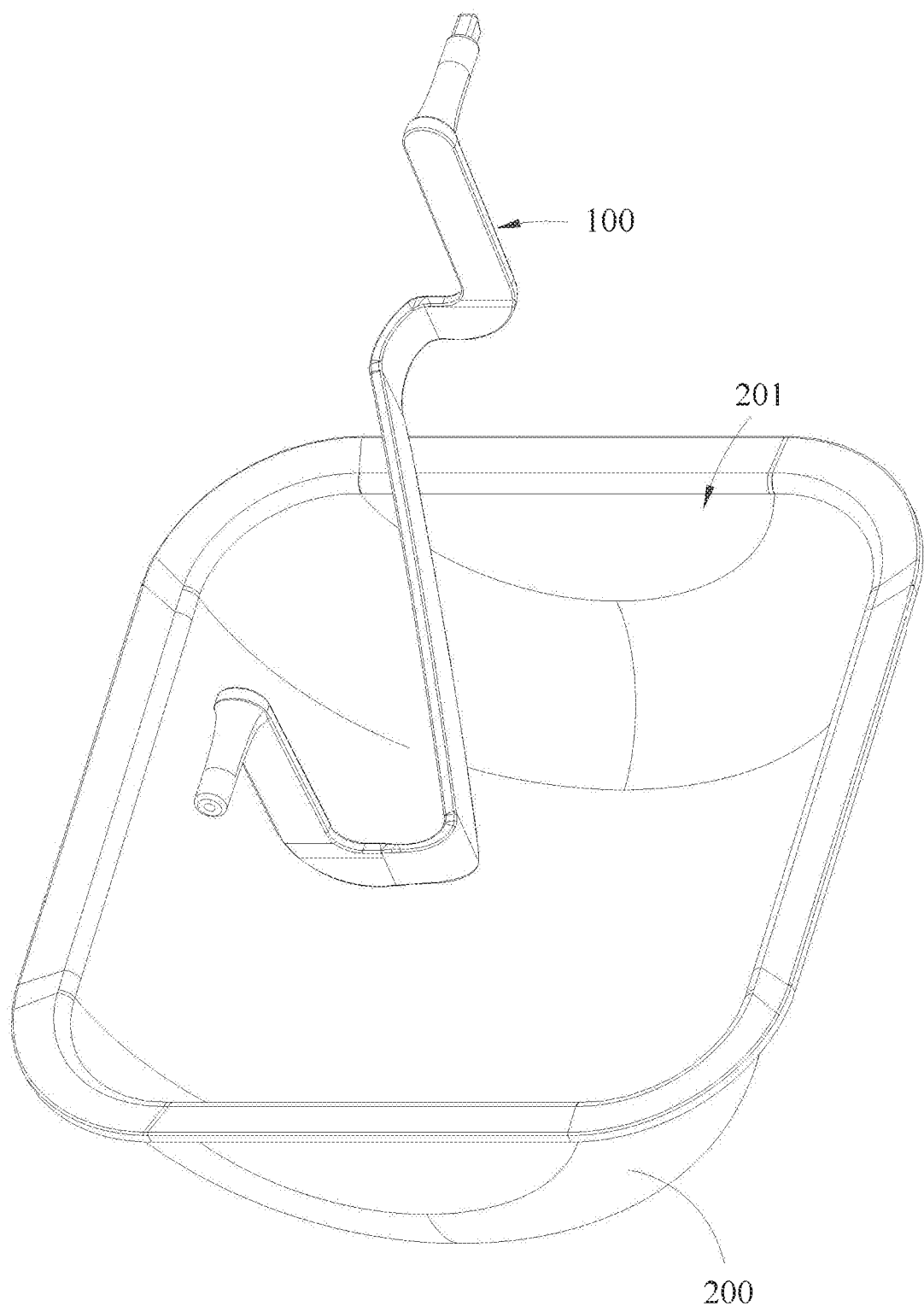
FIG. 4 is an exploded view of a stirring mechanism according to a second embodiment of the present invention.

Referring to FIG. 4, the stirring mechanism includes a stirring rib 100 (see FIG. 1 to FIG. 3), and a pot 200, where a specific structure of the stirring rib 100 may be referred to the first embodiment; an open chamber 201 is formed on the pot 200; the first extending rod 150, the second extending rod 160 and the stirring blade 170 are placed in the open chamber 201; and both the first connecting rod 130 and the second connecting rod 140 extend from an inside of the open chamber 201 to an outside of the open chamber 201.

Further, a mating surface is formed when the first connecting rod 130, the second connecting rod 140, the first extending rod 150, the second extending rod 160, and an outer edge of the stirring blade 170 swing back and forth with the first rotating shaft 110 or the second rotating shaft 120, and a chamber surface of the open chamber 201 is matched with the mating surface. Based on this structural design, it can be ensured that the stirring rib 100 sufficiently stirs the food material in the pot 200.

Still further, a gap between a chamber surface of the open chamber 201 and the mating surface is 0.5-3 mm. In this way, it is possible to prevent the stirring blade 170 from directly propping against the pot 200, and it is also possible to make the food material turned over and stirred by the stirring blade 170 as much as possible.

Embodiment 3

The present invention further provides a cooking robot, which includes a stirring mechanism. A specific structure of the stirring mechanism is referred to the above-mentioned second embodiment. Since all technical solutions of all of the above embodiments are adopted by the cooking robot, the cooking robot has all beneficial effects brought about by the technical solutions of the above embodiments, which are no longer repeated here.

The above are only the optional embodiments of the present invention, and are not intended to limit the present invention. Any modifications, equivalent substitutions or improvements and the like made within the spirit and principles of the present invention should be included in the scope of protection of the present invention.

What is claimed is:

1. A stirring rib, comprising a first rotating shaft, a second rotating shaft, a first connecting rod, a second connecting rod, a first extending rod, a second extending rod, and a stirring blade, wherein the first rotating shaft and the second rotating shaft are disposed oppositely, coaxially and horizontally; the first connecting rod is connected to one shaft end of the first rotating shaft and is arranged in a downward extending manner; the second connecting rod is connected to one shaft end of the second rotating shaft and is arranged in a downward extending manner; the first extending rod is connected to a bottom of the first connecting rod, is arranged in a forward extending manner, and is perpendicular to the first rotating shaft and the first connecting rod; the second extending rod is connected to a bottom of the second connecting rod, is arranged in a backward extending manner, and is perpendicular to the second rotating shaft and the second connecting rod; one end of the stirring blade is connected to a free end of the first extending rod, and the other end of the stirring blade is connected to a free end of the second extending rod; and a blade surface of the stirring blade is perpendicular to a horizontal plane, and the blade surface of the stirring blade is disposed at an included angle of 5-35° with an axial line of the first rotating shaft or the second rotating shaft.

2. The stirring rib according to claim 1, wherein the first extending rod is disposed in a platy manner and is perpendicular to the horizontal plane; the first extending rod is connected with the stirring blade through a first connecting blade; the first connecting blade is disposed in an arc-shaped manner, and a blade surface of the first connecting blade is perpendicular to the horizontal plane; and the first connecting blade is fitted to a curved surface of the stirring blade, and is further fitted to a curved surface of the first extending rod.

3. The stirring rib according to claim 2, wherein the second extending rod is disposed in a platy manner and is perpendicular to the horizontal plane; the second extending rod is connected with the stirring blade through a second connecting blade; the second connecting blade is disposed in an arc-shaped manner, and a blade surface of the second connecting blade is perpendicular to the horizontal plane; and the second connecting blade is fitted to a curved surface of the stirring blade, and is further fitted to a curved surface of the second extending rod.

4. The stirring rib according to claim 1, wherein the first connecting rod and the second connecting rod are equal in length.

5. The stirring rib according to claim 1, wherein the first connecting rod is connected to a shaft end, close to the second rotating shaft, of the first rotating shaft, and/or the second connecting rod is connected to a shaft end, close to the first rotating shaft, of the second rotating shaft.

6. A stirring mechanism, comprising the stirring rib according to claim 1, and a pot, wherein an open chamber is formed on the pot; the first extending rod, the second extending rod and the stirring blade are placed in the open chamber; and both the first connecting rod and the second connecting rod extend from an inside of the open chamber to an outside of the open chamber.

7. The stirring mechanism according to claim 6, wherein a mating surface is formed when the first connecting rod, the second connecting rod, the first extending rod, the second extending rod and an outer edge of the stirring blade swing back and forth with the first rotating shaft or the second rotating shaft; and a chamber surface of the open chamber is matched with the mating surface.

8. The stirring mechanism according to claim 6, wherein a gap between a chamber surface of the open chamber and the mating surface is 0.5-3 mm.

9. A cooking robot, comprising the stirring mechanism according to claim 6.

* * * * *